United States Patent
Chen

(10) Patent No.: US 8,711,559 B2
(45) Date of Patent: Apr. 29, 2014

(54) PUSH TO RELEASE COVER FOR A PORTABLE ELECTRONIC DEVICE

(75) Inventor: Chao Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 359 days.

(21) Appl. No.: 13/274,604

(22) Filed: Oct. 17, 2011

(65) Prior Publication Data

US 2012/0099258 A1 Apr. 26, 2012

Related U.S. Application Data

(63) Continuation of application No. 12/909,202, filed on Oct. 21, 2010, now Pat. No. 8,072,749.

(51) Int. Cl.
*G06F 1/16* (2006.01)

(52) U.S. Cl.
USPC .............. 361/679.58; 361/679.02; 361/679.3; 206/320; 206/701

(58) Field of Classification Search
USPC .................................. 361/679.58
See application file for complete search history.

(56) References Cited

U.S. PATENT DOCUMENTS

| | | | | | |
|---|---|---|---|---|---|
| 5,673,180 | A | * | 9/1997 | Pernet | 361/756 |
| 5,768,095 | A | * | 6/1998 | Nakamura et al. | 361/679.09 |
| 6,819,128 | B2 | * | 11/2004 | Hisaishi et al. | 324/756.02 |
| 7,052,798 | B2 | * | 5/2006 | Kaelin et al. | 429/96 |
| 7,561,419 | B2 | * | 7/2009 | Lee et al. | 361/679.58 |
| 7,711,111 | B2 | * | 5/2010 | Chuang | 379/433.11 |
| 8,148,633 | B2 | * | 4/2012 | Hung | 174/50 |
| 8,254,118 | B2 | * | 8/2012 | Liu | 361/679.58 |
| 8,264,836 | B2 | * | 9/2012 | Peng | 361/679.56 |
| 2009/0289074 | A1 | * | 11/2009 | McNamara | 220/780 |

* cited by examiner

*Primary Examiner* — Anthony Q Edwards
(74) *Attorney, Agent, or Firm* — Gowling Lafleur Henderson LLP

(57) ABSTRACT

A cover assembly for a portable electronic device is described. The cover assembly has a cover comprising: two cover extensions extending substantially perpendicular from the cover. Each of the two cover extensions has an abutment towards a center. An angular spring with two wings and two upwards arcuate ends is included in the cover assembly, each of the wings forming a bias angle relative to a line between the two ends. Two housing extensions extend from a surface of the portable electronic device, each of the housing extensions has a protrusion mating the corresponding abutment, and a guide having a form substantially corresponding to the upwards arcuate end. When a force is applied to the center of the angular spring, the bias angle decreases and the upwards arcuate ends are urged upwards, thereby causing the abutments moving outwards, and unlocking the protrusions.

19 Claims, 5 Drawing Sheets

PUSH TO RELEASE COVER FOR A PORTABLE ELECTRONIC DEVICE

CROSS-REFERENCE TO RELATED APPLICATIONS

This application is a continuation of application Ser. No. 12/909,202 filed on Oct. 21, 2010, the entire disclosure of which is hereby incorporated by reference for all purposes.

BACKGROUND

The present disclosure relates to a cover for a portable electronic device, and more specifically, to a push to release cover for a portable electronic device.

The manufacture and design of today's portable electronic devices, for example, mobile phones, smart phones, PDAs, laptop computers, is constantly evolving. Early portable electronic device designs were necessarily large and bulky. Advances in circuitry and storage technology have enabled portable electronic device designers to create smaller and smaller devices. These instruments are not only lighter, but also less cumbersome and easier to transport. Today's portable electronic devices have become more fashionable, at the same time provide an increasing number of functionalities.

The ever decreasing sizes of today's portable electronic devices have the unintended consequence of requiring not only the electronic parts, but also the mechanical parts to shrink in size. One example of such mechanical parts is the cover for the portable electronic devices.

FIG. 1 provides one example of a conventional design of a cover latch of a portable electronic device 100, for example but not limited to, a mobile wireless device. As the size, especially the thickness of the portable electronic devices decreases, there is no room for a cover latch close 102 to a central opening 104.

As a consequence, the cover latch 106 is generally designed in the rear and on the sides of the housing of the portable electronic device 100. The design of an opening in the center may prove to be not desirable to consumers. For example, the opening in the back of the portable electronic device may not be aesthetically appealing to consumers. Furthermore, a user's nail may be damaged when used to open the cover.

Therefore, there is a need for a cover latch mechanism without an opening for a contemporary designed portable electronic device.

BRIEF DESCRIPTION OF THE DRAWINGS

These and other features of the patent disclosure will become more apparent from the following description in which reference is made to the appended drawings wherein.

DETAILED DESCRIPTION OF PREFERRED EMBODIMENTS

Figure 1:
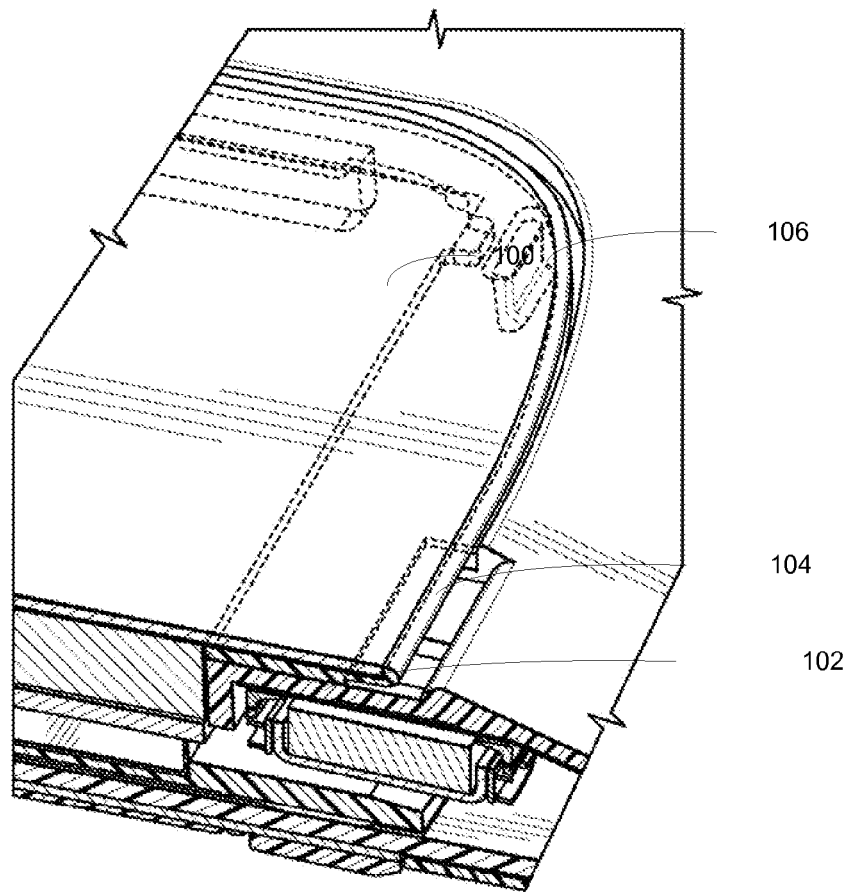
FIG. 1 shows a conventional design of a cover latch of a portable electronic device.

In accordance with one embodiment of the present patent disclosure there is provided a cover assembly for a portable electronic device. The cover assembly comprises a cover for the portable electronic device, which comprises: two cover extensions extending substantially perpendicular from the cover. Each of the two cover extensions has an abutment at the end of the cover extension facing each other. A span width is defined between the cover extensions. The cover assembly further comprises an angular spring having a center and two wings with upwards arcuate ends spanning substantially the span width. Each of the wings forms a bias angle relative to a line extending from one upward arcuate end to the other. The cover assembly further comprises two housing extensions extending from a surface of the portable electronic device. Each of the housing extensions has a protrusion mating the corresponding abutment of the cover extension, and a guide with a form substantially corresponding the upwards arcuate end of the angular spring. When a force is applied to the center of the angular spring, the bias angle decreases and the upwards arcuate ends are urged upwards, thereby causing the abutments moving outwards, and unlocking the protrusions.

In accordance with another embodiment of the present patent disclosure there is provided a portable electronic device comprising the cover assembly.

Preferably, the cover is resilient.

Preferably, the cover is in contact with a center of the angular spring.

Preferably, the cover is a back cover of the portable electronic device.

Preferably, the cover is a battery cover of the portable electronic device.

Preferably, the bias angle is between 1° to 30°, more preferably between 1° to 20°, and even more preferably between 1° to 10°.

Preferably, the cover extensions are extended from the edges of the cover.

Preferably, the angular spring is attached to the cover.

Preferably, the cover extensions are along two entire edges of the portable electronic device.

Preferably, the center and the two upwards arcuate ends of the angular spring are in a single plane.

Preferably, the center of the angular spring is wider than the two upwards arcuate ends.

Preferably, the span width substantially corresponds to a width of the portable electronic device.

Preferably, the cover has a protrusion in the center.

Reference will now be made in detail to some specific embodiments of the patent disclosure including the best modes contemplated by the inventors for carrying out the patent disclosure. Examples of these specific embodiments are illustrated in the accompanying drawings. While the patent disclosure is described in conjunction with these specific embodiments, it will be understood that it is not intended to limit the patent disclosure to the described embodiments. On the contrary, it is intended to cover alternatives, modifications, and equivalents as may be included within the spirit and scope of the patent disclosure as defined by the appended claims. In the following description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For the purposes of the present specification and appended claims, the terms "upwards" and "downwards" refer to direction when the portable electronic devices is in a face-down, cover-up position, such as depicted in FIGS. 2(A)-2(C), and 6-7.

Figure 2A:
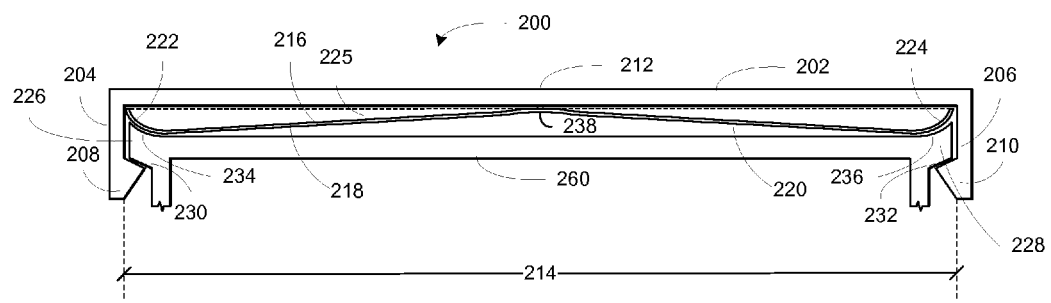
FIG. 2(A) illustrates a sectional view of a cover assembly in accordance with one embodiment of the present patent disclosure.

Referring to FIG. 2(A), there is illustrated a sectional view of a cover assembly 200 for a portable electronic device in accordance with one embodiment of the present patent disclosure. For the purposes of the following specification and appended claims, the term "portable electronic device" refers to mobile phones, PDAs, pagers, calculators, laptop computers, and other similar electronic devices as commonly known in the art.

The cover assembly 200 includes a cover 202 and two extensions 204, 206 extending from the cover 200. The extensions as illustrated are substantially perpendicular to the cover 202. In various embodiments, other forms of extension may also be used as known in the art. At the end of each of the two extensions 204, 206 there is an abutment or protrusion 208, 210 facing each other. The distance between the cover extensions 204, 206 is considered as a span width 214.

In the illustrated embodiment in FIG. 2(A), the extensions 204, 206 are extended from the respective edges of the cover 202. In various embodiments, the cover extensions may be extended from other regions of the cover. In these embodiments, the cover may have the same footprint as the portable electrical device, but the cover assembly mechanism as described may be implemented as a recess in the portable electrical device.

In various embodiments, the cover 202 may be a back cover of the portable electrical device, for example but not limited to, a battery cover of the portable electrical device.

Figure 3:
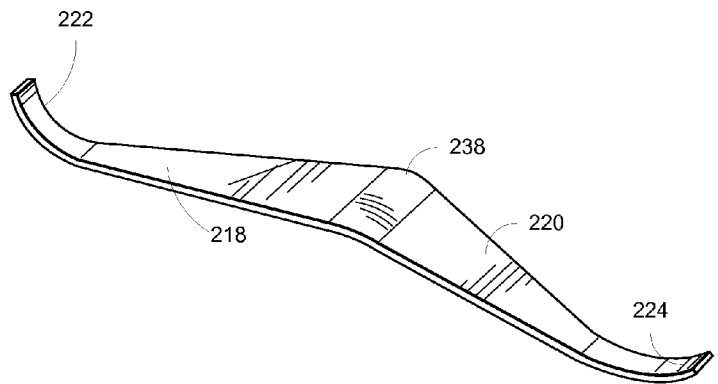
FIG. 3 is a perspective view of the angular spring of the cover assembly in accordance with one embodiment of the present patent disclosure.
Figure 4:
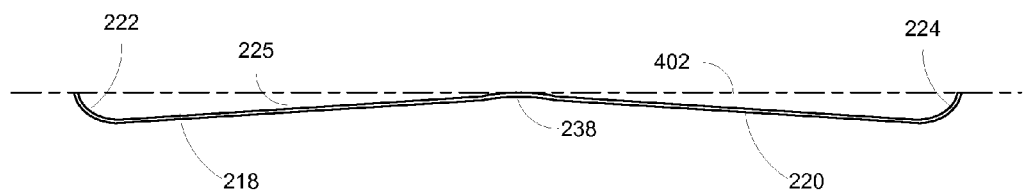
FIG. 4 is a sectional view of the angular spring of the cover assembly in accordance with one embodiment of the present patent disclosure.

A second component of the cover assembly 200 is an angular spring 216. As best illustrated by FIGS. 2(A), 3 and 4 collectively, the angular spring 216 includes two wings 218, 220. Each of the wings 218, 220 has an upwards arcuate end 222, 224. The distance between the tips of the upwards arcuate ends 222, 224 corresponds substantially to the span width 214.

Referring to FIG. 2(A) and FIG. 4, each of the wings 218, 220 forming a bias angle 225 relative to a line 402 extending from one 222 of the upward arcuate ends to the other 224.

Referring again to FIG. 2(A), the cover assembly 200 in accordance with one embodiment of the present patent disclosure further includes two housing extensions 226, 228 extending from a housing of the portable electronic device. Each of the housing extensions 226, 228 has a protrusion 230, 232 mating the corresponding abutment 208, 210 of the cover extension 204, 206. In the depicted embodiments, the abutments 208, 210 have a triangular profile, while the corresponding protrusions 230, 232 have an upwardly inclined shape. As will be apparent to one of skill in the art, a variety of other mating shapes, for example but nor limited to, circular, chamfered, arcuate, may also be employed according to several embodiments to lock the cover. In the present patent disclosure, the term "mating" is intended to describe a portion of the cover surface and a portion of the housing surface, which provides a latching mechanism when the cover is engaged with the housing of the portable electronic device.

Each housing extension 226, 228 also has a guide 234, 236 which is formed substantially corresponding to the upwards arcuate end 222, 224 of the angular spring 216.

The cover 202 of the portable electronic device is typically made of a flexible and/or resilient material, for example but not limited to, durable polymer, composite material or metal as known in the art.

Figure 2B:
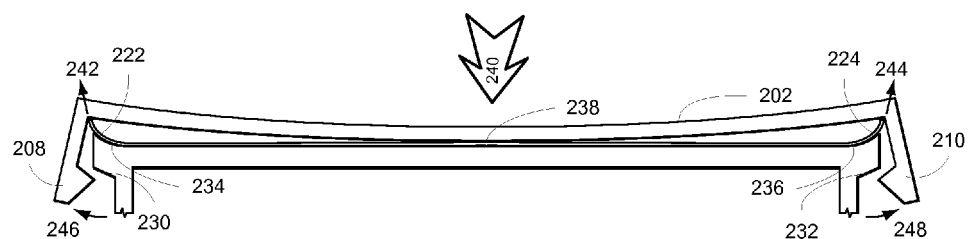
FIG. 2(B) illustrates a sectional view of the cover assembly of FIG. 2(A) when an actuation force is applied.

Referring to FIG. 2(B), to open the cover of the portable electronic device, a user simply applies an actuation force by pressing the cover 212. As will be apparent to one of ordinary skill in the art, an actuation force 240 applied to a center 238 of the angular spring 216, deflects the wings of the angular spring 216. As a result, the bias angle 225 decreases and the upwards arcuate ends 222, 224 are urged upwards 242, 244 by the guides 234, 236, thereby causing the abutments 208, 210 to move outwards 246, 248, and unlocking the protrusions 230, 232. In general, the deflection of the cover 212 may be 0.1-10 mm, preferably 0.2-5 mm, more preferably, 0.5-1 mm.

In the embodiment illustrated in FIG. 2(A) the center 212 of the cover 202 is in contact with the angular spring 216. In other embodiments of the present patent disclosure, the cover may not be in direct contact with the angular spring. In these embodiments, when the actuation force is sufficiently applied to the cover, the deflection of the cover causes the angular spring to unlatch the cover in a similar fashion as described in FIGS. 2(A) and 2(B).

In yet other embodiments of the present patent disclosure, the angular spring may be attached to the cover or to the housing of the portable electronic device.

Figure 2C:
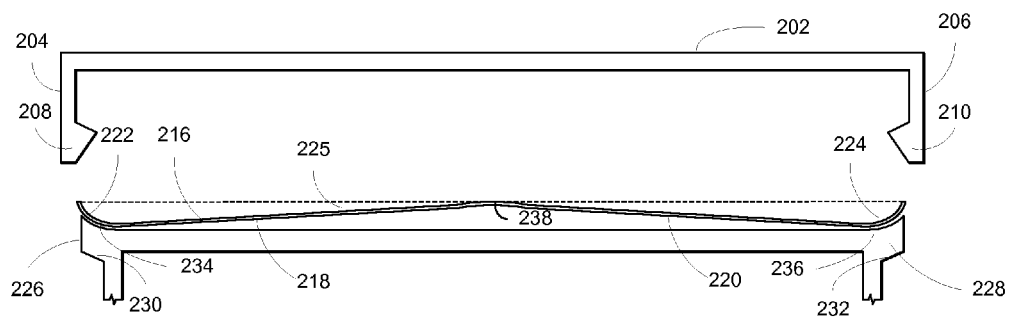
FIG. 2(C) illustrates a sectional view of the cover assembly of FIG. 2(A) when the cover is separated from the housing of the portable electronic device.

FIG. 2(C) depicts a cover 202 which is removed from the housing of the portable electronic device.

FIG. 3 is a perspective view of the angular spring 216 in accordance with one embodiment of the present patent disclosure. Preferably, the center 238 of the angular spring 216 is wider than the upwards arcuate ends 222, 224, so that the force in the center is better transferred to the upwards arcuate ends 222, 224.

The angular spring 216 may be made of diverse flexible and/or resilient material as understood by a skilled artisan. Preferably, the angular spring 216 is made of metal. The thickness of the angular spring 216 may be between 0.1 to 2 mm, preferably between 0.2 to 0.4 mm.

Figure 5:
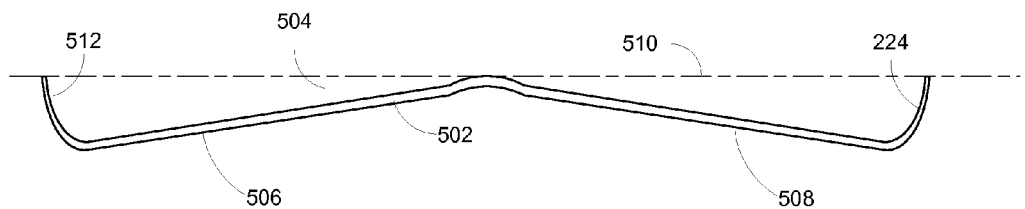
FIG. 5 is a sectional view of the angular spring of the cover assembly in accordance with another embodiment of the present patent disclosure.

FIG. 5 shows a sectional view of an angular spring 502, the bias angle 504 between each of the wings 506, 508 and a line 510 extending from one 512 of the upward arcuate ends to the other 514 is greater than the bias angle 225 in FIG. 4. While a thin portable electronic device may require a small bias angle, while in other applications, for example but not limited to, laptop computers, the preferred bias angle may be large. In general, the bias angle is between 1° to 30°, preferably between 1° to 20°, and more preferably between 1° to 10°.

In the embodiment illustrated in FIG. 2(A), the extensions 226, 228 may be extended from the housing of the portable electronic device, at least at one section of the portable electronic device along a longitudinal axis of the portable electronic device where the housing is continuous from one side to the other. In this embodiment, the housing 260 is closed at that section.

Figure 6:
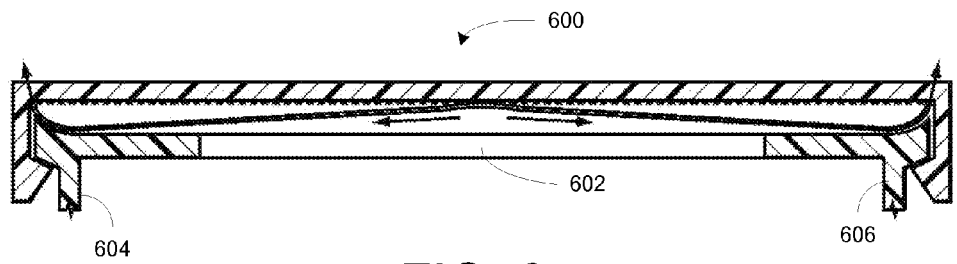
FIG. 6 is a sectional view of a cover assembly in accordance with another embodiment of the present patent disclosure.

FIG. 6 depicts a cover assembly 600 in accordance with another embodiment of the present patent disclosure. The depicted embodiment includes an opening 602 at the section where the cover assembly is located.

Figure 7:
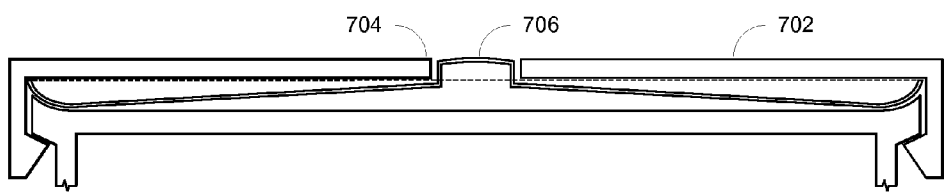
FIG. 7 is a sectional view of a cover assembly in accordance with another embodiment of the present patent disclosure.

FIG. 7 illustrates another embodiment of the present patent disclosure where the cover 702 includes a opening 704. The angular spring 706 is directly accessible to the user. Instead of actuating the cover of the portable electronic device, the user presses the angular spring 706 to open the cover.

Figure 8:
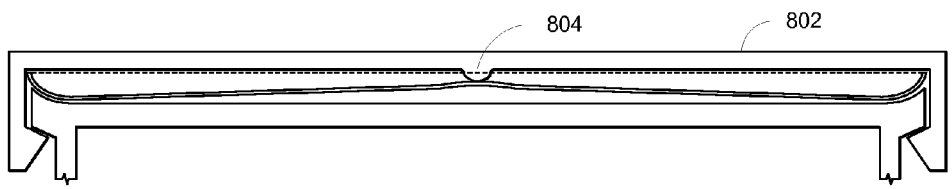
FIG. 8 is a sectional view of a cover assembly in accordance with another embodiment of the present patent disclosure.

FIG. 8 shows yet another embodiment of the present patent disclosure where the cover 802 has a protrusion 804 in the center to assist the opening of the cover. Comparing to the angular spring in FIG. 4, the center of the angular spring in the embodiment depicted in FIG. 8 may not be in the same plane as the two upward arcuate ends.

Figure 9:
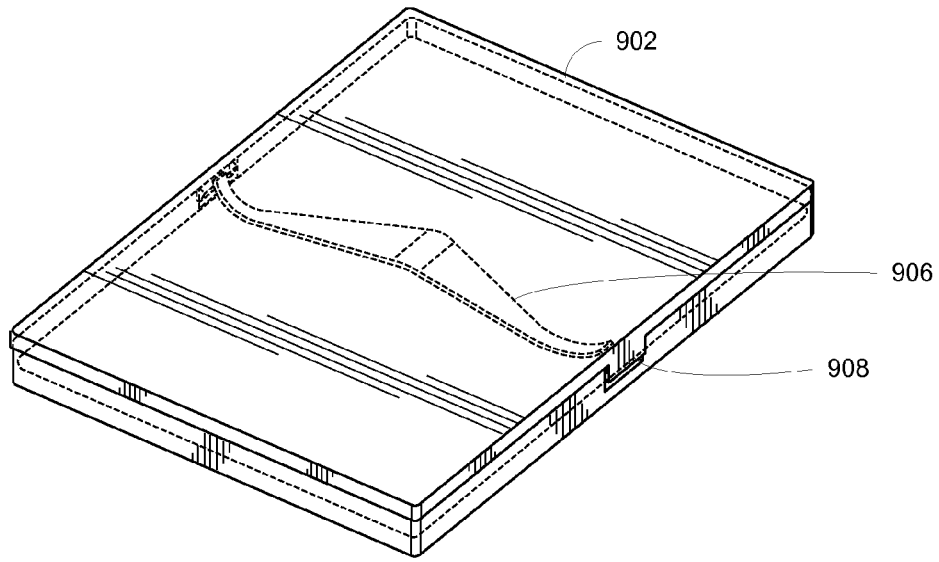
FIG. 9 is a perspective view of a portable electronic device in accordance with one embodiment of the present patent disclosure.

FIG. 9 is an perspective view of a portable electronic device 902 with a cover assembly 904 in accordance with another embodiment of the present patent disclosure. In this embodiment, the cover assembly 904 is located in the middle of the portable electronic device. The position of the angular spring 906 inside the portable electronic device 902 is also illustrated. In this embodiment, the extension 908 of the cover is only a portion of the edge of the portable electronic device 902.

Figure 10:
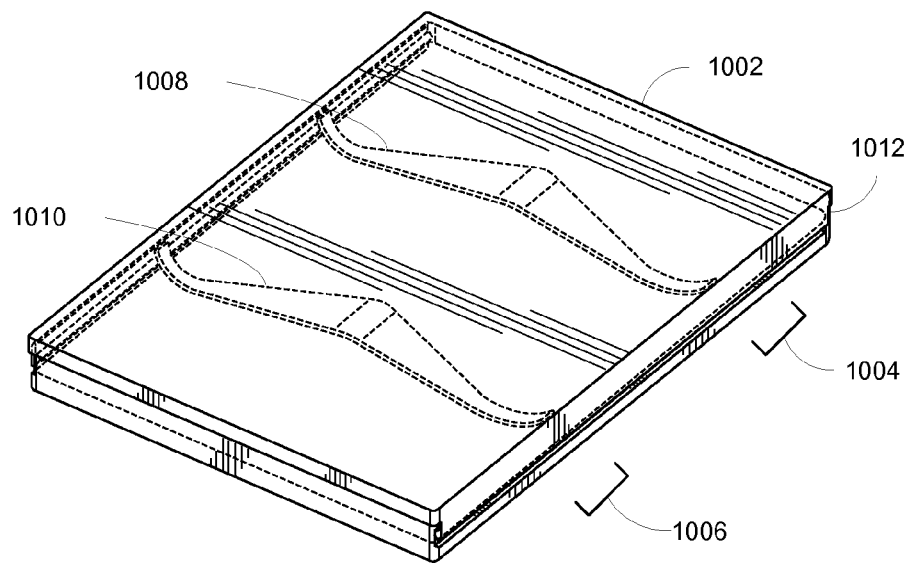
FIG. 10 is a perspective view of a portable electronic device in accordance with another embodiment of the present patent disclosure.

FIG. 10 is an perspective view of a portable electronic device 1002 with two cover assemblies 1004, 1006 in accordance with another embodiment of the present patent disclosure. In this embodiment, the assemblies 1004, 1006 may be pressed simultaneously to open the cover of the portable electronic device. The position of the angular springs 1008, 1010 inside the portable electronic device 1002 are also illustrated. In this embodiment, the extension 1012 of the cover is along the entire edge of the portable electronic device 1002.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

What is claimed is:

1. A cover assembly for a portable electronic device comprising:
a cover comprising:
two cover extensions extending substantially perpendicular from the cover and having a span width there between;
an angular spring having a center and two wings with upwards arcuate ends spanning substantially the span width;
two housing extensions extending from a surface of the portable electronic device, and a guide guiding the upwards arcuate end of the angular spring;
wherein when a force is applied to the center of the angular spring, the upwards arcuate ends are urged upwards by the guide, disengaging the cover from the portable electronic device.

2. The cover assembly according to claim 1, wherein the cover is resilient.

3. The cover assembly according to claim 1, wherein the cover is in contact with the center of the angular spring.

4. The cover assembly according to claim 1, wherein the cover is a back cover of the portable electronic device.

5. The cover assembly according to claim 1, wherein the cover is a battery cover of the portable electronic device.

6. The cover assembly according to claim 1, wherein a bias angle defined by the two wings relative to a line extending from one of the upper arcuate ends to the other is between 1° to 30°, preferably between 1° to 20°, and more preferably between 1° to 10°.

7. The cover assembly according to claim 1, wherein the cover extensions are extended from edges of the cover.

8. The cover assembly according to claim 1, wherein the angular spring is attached to the cover.

9. The cover assembly according to claim 1, wherein the cover extensions are along two entire edges of the portable electronic device.

10. The cover assembly according to claim 1, wherein the center and the two upwards arcuate ends of the angular spring are in a single plane.

11. The cover assembly according to claim 1, wherein the center of the angular spring is wider than the two upwards arcuate ends.

12. The cover assembly according to claim 1, wherein the cover has a protrusion in the center.

13. A portable electronic device comprising:
a cover comprising: two cover extensions extending substantially perpendicular from the cover and having a span width there between;
an angular spring having a center and two wings with upwards arcuate ends spanning substantially the span width;
two housing extensions extending from a surface of the portable electronic device, and a guide guiding the upwards arcuate end of the angular spring;
wherein when a force is applied to the center of the angular spring, the upwards arcuate ends are urged upwards by the guide; disengaging the cover from the portable electronic device.

14. The portable electronic device according to claim 13, wherein the cover is a back cover of the portable electronic device.

15. The portable electronic device according to claim 13, wherein the cover is a battery cover of the portable electronic device.

16. The portable electronic device according to claim 13, wherein the cover extensions are extended from edges of the cover.

17. The portable electronic device according to claim 13, wherein the center and the two upwards arcuate ends of the angular spring are in a single plane.

18. The portable electronic device according to claim 13, wherein the center of the angular spring is wider than the two upwards arcuate ends.

19. A cover assembly for a portable electronic device comprising:
- a cover comprising:
    - two cover extensions extending substantially perpendicular from the cover, each of the two cover extensions having an abutment at an end of the cover extension and facing each other;
- an angular spring having a center and two wings with upwards arcuate ends spanning the cover extensions;
- two housing extensions extending from two opposite edges of the portable electronic device, each of the housing extensions having a protrusion engaging the corresponding abutment of the cover extension, and a guide guiding the upwards arcuate end of the angular spring;
- wherein when a force is applied to the angular spring, the upwards arcuate ends are urged upwards by the guide, thereby causing the abutments moving outwards, and disengaging the abutments from the protrusions.

* * * * *